United States Patent [19]
Moeller et al.

[11] Patent Number: 5,903,264
[45] Date of Patent: *May 11, 1999

[54] VIDEO DELIVERY SYSTEM AND METHOD FOR DISPLAYING AN INDEXING SLIDER BAR

[75] Inventors: Chris Moeller, Morgan Hill; Mike DeMoney, Los Gazos; Rob Goedman, Palo Alto, all of Calif.

[73] Assignees: Sun Microsystems, Inc., Palo Alto, Calif.; Thomson Consumer Electronics, Inc., Indianapolis, Ind.

[ * ] Notice: This patent is subject to a terminal disclaimer.

[21] Appl. No.: 09/065,629

[22] Filed: Apr. 24, 1998

Related U.S. Application Data

[63] Continuation of application No. 08/673,582, Jul. 1, 1996.
[51] Int. Cl.$^6$ .................................................. G06F 3/00
[52] U.S. Cl. ........................... 345/327; 345/7; 345/13; 345/974
[58] Field of Search .................... 345/326–358, 345/974; 348/7, 12, 13

[56] References Cited

U.S. PATENT DOCUMENTS

| | | | |
|---|---|---|---|
| 5,202,961 | 4/1993 | Mills et al. | 345/328 |
| 5,237,648 | 8/1993 | Mills et al. | 345/328 |
| 5,371,532 | 12/1994 | Gelman et al. | 345/329 X |
| 5,388,197 | 2/1995 | Rayner | 345/326 |
| 5,442,390 | 8/1995 | Hooper et al. | 345/7 |
| 5,517,257 | 5/1996 | Dunn et al. | 345/327 |
| 5,644,714 | 7/1997 | Kikinis | 345/7 X |
| 5,818,439 | 10/1998 | Nagasaka et al. | 345/327 |

OTHER PUBLICATIONS

International Search Report for PCT/US 97/11453, dated Oct. 23, 1997.

Primary Examiner—John E. Breene
Attorney, Agent, or Firm—Conley, Rose & Tayon; Jeffrey C. Hood

[57] ABSTRACT

A system and method which displays a graphical icon, such as a slider bar, on a subscriber's television or display unit for indexing to different positions in a video stream in an interactive video delivery system. The interactive video delivery system preferably comprises at least one media server which stores one or more video streams, and one or more subscribers which each include a display device, such as a television. The television displays a slider bar or other graphical icon, and the slider bar is used to index to different locations in the video stream. During video delivery, the user may use or adjust a knob on the slider bar, preferably using a remote control device, to indicate a desire to "jump" to a different location in the movie or video stream. The media server receives the slider bar user input from the subscriber device and begins outputting the normal play stream at the desired position.

27 Claims, 8 Drawing Sheets

Create Index Table

FIG. 6

MPEG Normal Play Stream

| Normal play time | File offset |
|---|---|
| 0 | 0 |
| 10 min | |
| Length of movie | Length of normal play file |

MPEG Fast Forward Stream

| Normal play time | File offset |
|---|---|
| 0 | 0 |
| 10 min | |
| Length of movie | Length of FF file |

MPEG Fast Reverse Stream

| Normal play time | File offset |
|---|---|
| 0 | Length of FR file |
| 10 min | |
| Length of movie | 0 |

VIDEO DELIVERY SYSTEM AND METHOD FOR DISPLAYING AN INDEXING SLIDER BAR

This is a continuation of Ser. No. 08/673,582, filed Jul. 1, 1996, titled Video Delivery System and Method Which Displays a Slider Bar on the Subscriber Video Screen for Indexing into a Video Stream (5180-00600).

INCORPORATION BY REFERENCE

The following references are hereby incorporated by reference.

The ISO/IEC MPEG specification referred to as ISO/IEC 13818 is hereby incorporated by reference in its entirety.

FIELD OF THE INVENTION

The present invention relates generally to video delivery and video-on-demand systems, and more particularly to a video delivery system and method which displays a slider bar on the subscriber television or display unit for indexing into locations in a video stream.

DESCRIPTION OF THE RELATED ART

Video-on-demand or video delivery systems enable a plurality of subscribers or users to selectively watch movies or other audio/video sequences which are stored on one or more video servers or media servers. The video servers are connected through data transfer channels, such as a broadcast cable system or satellite broadcast system, to the plurality of subscribers or users. The video servers store a plurality of movies or other audio/video sequences, and each user can select one or more movies from the video servers for viewing. Each user includes a television or other viewing device, as well as associated decoding logic, for selecting and viewing desired movies. When a user selects a movie, the selected movie is transferred on one of the data transfer channels to the television of the respective user.

Full-motion digital video requires a large amount of storage and data transfer bandwidth. Thus, video-on-demand systems use various types of video compression algorithms to reduce the amount of necessary storage and data transfer bandwidth. In general, different video compression methods exist for still graphic images and for full-motion video. Video compression methods for still graphic images or single video frames are referred to as intraframe compression methods, and compression methods for motion video are referred to as interframe compression methods.

Examples of video data compression for still graphic images are RLE (run-length encoding) and JPEG (Joint Photographic Experts Group) compression. The RLE compression method operates by testing for duplicated pixels in a single line of the bit map and storing the number of consecutive duplicate pixels rather than the data for the pixel itself. JPEG compression is a group of related standards that provide either lossless (no image quality degradation) or lossy (imperceptible to severe degradation) compression types. Although JPEG compression was originally designed for the compression of still images rather than video, JPEG compression is used in some motion video applications.

In contrast to compression algorithms for still images, most video compression algorithms are designed to compress full motion video. Video compression algorithms for motion video use a concept referred to as interframe compression, which involves storing only the differences between successive frames in the data file. Interframe compression stores the entire image of a key frame or reference frame, generally in a moderately compressed format. Successive frames are compared with the key frame, and only the differences between the key frame and the successive frames are stored. Periodically, such as when new scenes are displayed, new key frames are stored, and subsequent comparisons begin from this new reference point. It is noted that the interframe compression ratio may be kept constant while varying the video quality. Alternatively, interframe compression ratios may be content-dependent, i.e., if the video clip being compressed includes many abrupt scene transitions from one image to another, the compression is less efficient. Examples of video compression which use an interframe compression technique are MPEG, DVI and Indeo, among others.

MPEG BACKGROUND

A compression standard referred to as MPEG (Moving Pictures Experts Group) compression is a set of methods for compression and decompression of full motion video images which uses the interframe compression technique described above. MPEG compression uses both motion compensation and discrete cosine transform (DCT) processes and can yield compression ratios of more than 200:1.

The MPEG standard requires that sound be recorded simultaneously with the video data, and the video and audio data are interleaved in a single file to attempt to maintain the video and audio synchronized during playback. The audio data is typically compressed as well, and the MPEG standard specifies an audio compression method such as MPEG Layer II, also known by the Philips trade name of "MUSI-CAM".

An MPEG stream includes three types of pictures, referred to as the Intra (I) frame, the Predicted (P) frame, and the Bi-directional Interpolated (B) frame. The I or Intra frames contain the video data for the entire frame of video and are typically placed every 10 to 15 frames. Intra frames provide entry points into the file for random access, and are generally only moderately compressed. Predicted frames are encoded with reference to a past frame, i.e., a prior Intra frame or Predicted frame. Thus P frames only include changes relative to prior I or P frames. In general, Predicted frames receive a fairly high amount of compression and are used as references for future Predicted frames. Thus, both I and P frames are used as references for subsequent frames. Bi-directional pictures include the greatest amount of compression and require both a past and a future reference in order to be encoded. Bi-directional frames are not used for references for other frames.

After the I frames have been created, the MPEG encoder divides each I frame into a grid of 16×16 pixel squares called macro blocks. The respective I frame is divided into macro blocks in order to perform motion compensation. Each of the subsequent pictures after the I frame are also divided into these same macro blocks. The encoder then searches for an exact, or near exact, match between the reference picture macro block and those in succeeding pictures. When a match is found, the encoder transmits a vector movement code or motion vector. The vector movement code or motion vector only includes information on the difference between the reference frame and the respective succeeding picture. The blocks in succeeding pictures that have no change relative to the block in the reference picture or frame are ignored. In general, for the frame(s) following a reference frame, i.e., P and B frames that follow a reference I or P frame, only small portions of these frames are different from the corresponding portions of the respective reference frame. Thus, for these frames, only the differences are captured, compressed and stored. Thus the amount of data that is actually stored for these frames is significantly reduced.

After motion vectors have been generated, the encoder then tracks the changes using spatial redundancy. Thus, after finding the changes in location of the macro blocks, the MPEG algorithm further reduces the data by describing the difference between corresponding macro blocks. This is accomplished through a math process referred to as the discrete cosine transform or DCT. This process divides the macro block into four sub blocks, seeking out changes in color and brightness. Human perception is more sensitive to brightness changes than color changes. Thus the MPEG algorithm devotes more effort to reducing color space rather than brightness.

Each picture or frame also includes a picture header which identifies the frame and includes information for that frame. The MPEG standard also includes sequence headers which identify the start of a video sequence. Sequence headers are only required once before the beginning of a video sequence. However, the MPEG-2 standard allows a sequence header to be transferred before any I frame or P frame. The sequence header includes information relevant to the video sequence, including the frame rate and picture size, among other information.

MPEG video streams used in digital television applications generally include a sequence header before every I frame and P frame. This is necessary to facilitate channel surfing between different video channels, which is an important user requirement. In general, when a user switches to a new channel, the video for the new channel can not be displayed until the next sequence header appears in the stream. This is because the sequence header includes important information about the video sequence which is required by the decoder before the sequence can be displayed. If a sequence header were not included before each I frame and/or P frame, then when the user switched to a new channel, the video for the new channel possibly could not be immediately displayed, i.e., the video could not be displayed until the next sequence header.

The sequence headers in an MPEG encoded stream include presentation timestamps which are used for providing a timestamp or time base within the encoded stream.

TRICK PLAY STREAMS

In an interactive video-on-demand (VOD) or near-video-on-demand (NVOD) system, it is greatly desirable for the user to be able to selectively fast forward and/or fast reverse through the movie being watched. Thus, some video-on-demand systems include fast forward and fast reverse streams, referred to as trick play streams, for each movie. When the user desires to fast forward or fast reverse through a movie, the user selects the fast forward or fast reverse option. The respective fast forward or fast reverse trick play stream is then transferred to the user at the appropriate point where the user was watching, instead of the normal play stream, thus simulating a fast forward or fast reverse of the movie being watched. Thus a single video stream, such as a movie, is encoded at different presentation rates to enable the video file to operate in fast forward or fast reverse speed in addition to the normal play presentation rate.

INDEXING

Interactive video-on-demand systems which include trick play streams require methods for indexing between the normal play stream and the trick play streams, as well as for indexing between the trick play streams. In other words, when a user is watching a movie and chooses to fast forward for a period of time, a mechanism is needed for the video server to switch from the normal play stream to the appropriate point or frame in the fast forward stream. When the user then desires to resume watching at normal play speed, a mechanism is also needed for the video server to switch from the frame being viewed in the fast forward stream to the appropriate point or frame in the normal play stream. Thus the video server must be able to determine the proper positions within video files when a switch occurs in outputting a first video file at a first presentation rate to a second video file at a second presentation rate.

Other types of indexing systems and methods are desired for enabling a user to easily index to different locations or positions in a movie. For example, it would be highly desirable for a user to be able to selectively and immediately jump to any location in a video stream without being required to view a trick play fast forward or fast reverse stream in the process. Therefore, an improved indexing system and method is desired for efficiently indexing to different positions in a video stream in a video delivery system. An improved indexing system and method is also desired which enables the user to selectively and immediately jump to any position in the video stream. An improved indexing system and method is further desired which does not require trick play streams and which reduces the processing burdens of the media server.

SUMMARY OF THE INVENTION

The present invention comprises a system and method which displays a graphical icon, such as a slider bar, on a subscriber's television or display unit for indexing to different positions in a video stream in an interactive video delivery system. The interactive video delivery system preferably comprises at least one media server which stores one or more video streams, and one or more subscriber units which each include a display device, such as a television. A set top box or other device used with each television displays a slider bar or other graphical icon, and the slider bar is used to index to different locations in the video stream.

In the preferred embodiment, the media server stores normal play streams, and may store one or more corresponding trick play streams, i.e., fast forward and/or fast reverse video streams, for each of the normal play streams. In the preferred embodiment, the media server stores normal play video streams which are preferably compressed using any of various types of video compression methods, preferably an MPEG method. The system of the present invention generates an index table or look-up table for each normal play stream which enables indexing to different positions in the stream. In creating an index table for a normal play stream, the system first analyzes the normal play stream and preferably creates a normal play time standard based on presentation timestamps comprised in the normal play stream. The system then preferably creates an index table or look-up table for the normal play stream using the normal play time standard. Each index table comprises an array of two-tuples, wherein the two-tuples are the normal play time standard and an index or offset into the respective stream. The index tables enable indexing to different locations in the stream. If the media server stores trick play streams, the system also preferably creates index tables for the trick play streams which enable indexing between the normal play and trick play streams.

An interactive application running on the set top box coupled to the television displays a graphical icon, such as a slider bar, on the television screen. In an alternate embodiment, the media server provides graphical data which displays the slider bar on the screen. In the preferred embodiment, the slider bar is displayed when the user pauses the movie. When the slider bar is displayed, the user may use or adjust a knob on the slider bar, preferably using a remote control device, to indicate a desire to "jump" to a different location in the movie or video stream.

In the preferred embodiment, the subscriber device or set top box receives the user input and calculates a value from 0 to 100 indicating a relative position in the movie or stream based on user manipulation of the slider bar. The set top box then provides this value to the media server. The media server receives the value representative of the slider bar user input from the subscriber device and calculates a normal play time value based on the received user input. The media server receives the value from 0 to 100 and uses the movie length to calculate a corresponding normal play time value. For example, if the user adjusts the slider bar to place the slider bar "knob" in the exact middle of the slider bar, the subscriber device provides an output of 50 to the media server. If the movie length is exactly two hours, the media server outputs a normal play time of one hour.

The media server then uses the respective index table to index into the normal play video stream. After the media server calculates the new normal play time, the media server uses the calculated normal play time to retrieve the appropriate offset in the normal play stream index table. This offset is then used to begin play of the normal play stream at the retrieved offset. The set top box then preferably adjust the location of the knob on the slider bar to reflect the correct position of the video stream being output. The media server may also optionally examine the current normal play time and offset of the normal play stream being output in order to halt the normal play stream at an appropriate point before outputting the stream at the retrieved offset.

In one embodiment, when the user first manipulates the slider bar to jump to a new location in a video stream, the media server caches the current normal play time and byte offset of the normal play stream. Thus, if the user later desires to return to the original point in the movie before any slider bar adjustments were made, the user presses a key on the remote control or selects a return option on the slider bar. This selection causes the media server to retrieve the appropriate normal play time and offset in the normal play stream index table. This offset is then used to being play of the normal play stream at the location where the stream originally was prior to any slider bar adjustments.

Therefore, the present invention efficiently allows indexing to different positions in a normal play stream. The present invention displays a graphical icon such as a slider bar which provides a simple and convenient mechanism for selecting a position in the video stream. The present invention also creates a normal play time standard which is used as a common reference, thus simplifying the indexing process.

BRIEF DESCRIPTION OF THE DRAWINGS

A better understanding of the present invention can be obtained when the following detailed description of the preferred embodiment is considered in conjunction with the following drawings, in which:

FIG. 6 illustrates index look-up tables for normal play and trick play streams according to the present invention;

DETAILED DESCRIPTION OF THE EMBODIMENTS

Video Delivery System

Figure 1:
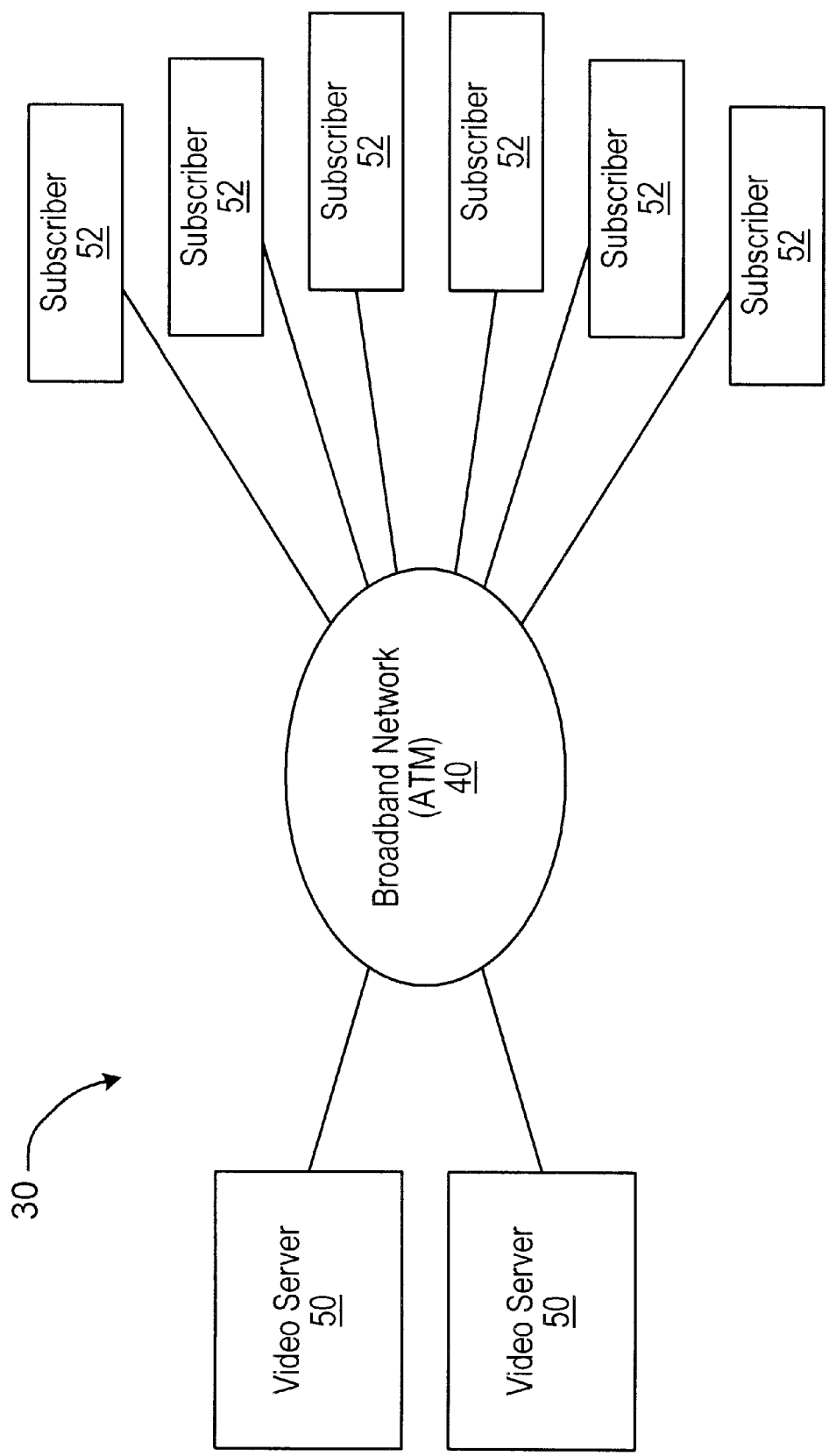
FIG. 1 illustrates a video delivery system including one or more media servers and one or more subscribers.

Referring now to FIG. 1, a video server or video delivery system 30 for storing and transferring video streams is shown. The system 30 is preferably a video-on-demand (VOD) or near video-on-demand (NVOD) system, or other type of video delivery system, which is capable of transferring or playing video or multimedia streams to one or more users, preferably a plurality of users. In the present disclosure, the term "video stream" is used to refer to a file or sequence of data for presenting a video display. The term "video stream" also includes a multimedia stream which includes both video and audio components.

Figure 2:
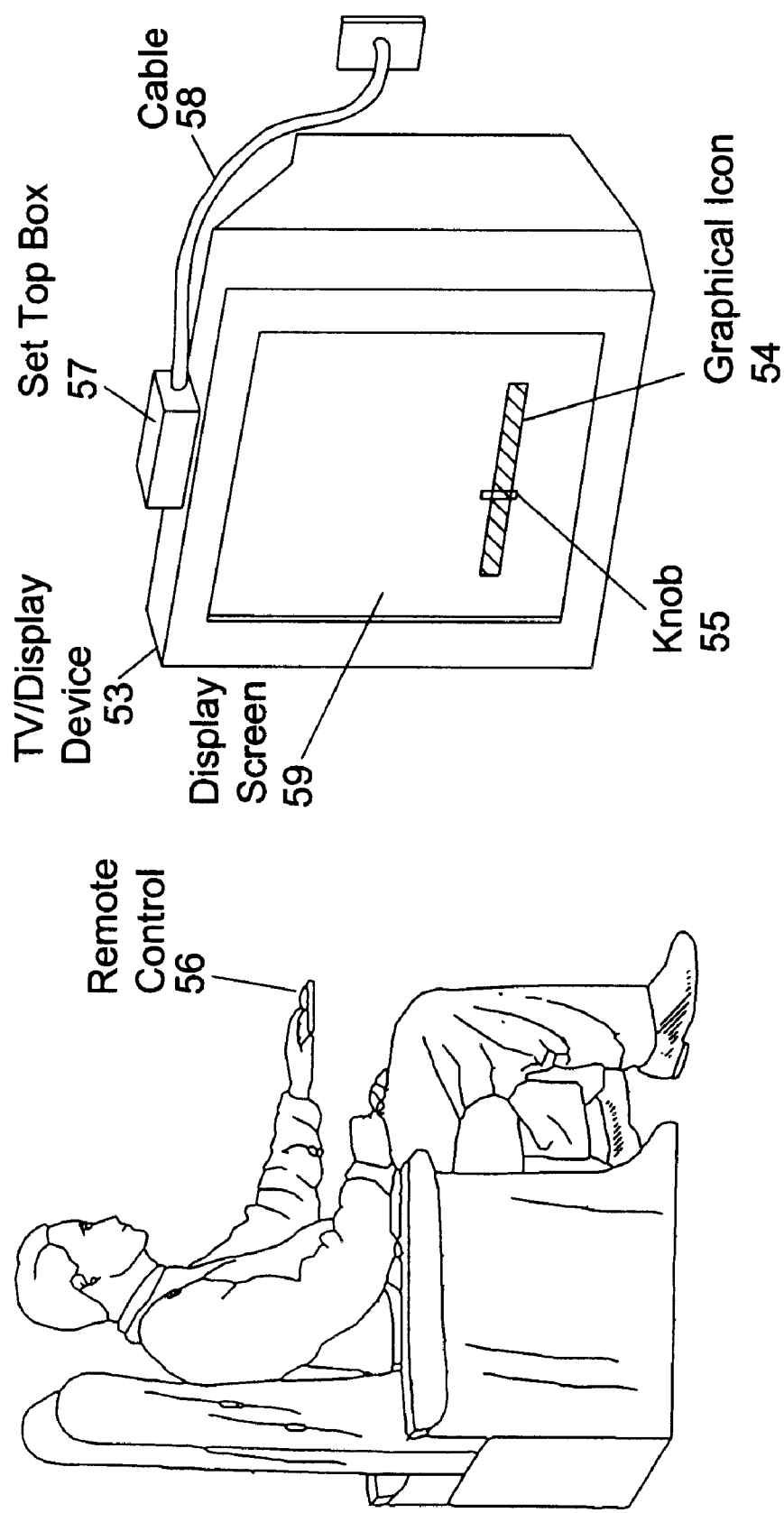
FIG. 2 illustrates a user viewing a television, wherein the television displays a slider bar for indexing into a video stream according to the present invention.

As shown, in one embodiment the video delivery system 30 comprises one or more media servers or video servers 50 connected through a broadband network 40 to a plurality of subscribers 52. As discussed below, each media server 50 preferably includes a general purpose computer system 60 (FIG. 2). The broadband network 40 is preferably a network suitable for multimedia content, such as an ATM (Asynchronous Transfer Mode) network, a satellite broadcast network, or an IP/RTP (Internet Protocol/Real Time Protocol) network. The subscribers 52 preferably include display devices such as televisions, computers, etc. The media servers 50 provide video or multimedia streams through the broadband network 40 to the respective subscribers 52.

The media server 50 is capable of transferring or playing a plurality of video or multimedia streams. In the preferred embodiment, the system 50 is capable of transferring or playing a normal play stream at any of various indicated positions or locations. In the present disclosure, the term "normal play stream" refers to a video stream designed to play at a normal or standard presentation rate. In one embodiment, each normal play stream may also have associated one or more trick play streams, which may comprise one or more of a fast forward and/or fast reverse stream. In the present disclosure, the term "trick play streams" refers to fast forward and/or fast reverse video streams, preferably compressed streams, which are generated from a normal play stream, and which have a different presentation rate than the normal play stream.

The normal play streams are preferably compressed video streams. The present invention operates independently of the type or format of the video streams. Thus the normal play video streams may be compressed in any of various types of formats, including MPEG-1, MPEG-2, Motion JPEG, QuickTime, etc. Further, the present invention operates independently of the frame rate and other presentation characteristics.

FIG. 2—Subscriber Unit

Referring now to FIG. 2, a diagram illustrating a user viewing a subscriber unit 52 according to the preferred embodiment of the present invention is shown. As shown, the subscriber unit 52 comprises a television or other display device 53. The television 53 includes a display screen 59 for displaying video images, as is well know in the art. It is noted that the television or display device 53 may comprise any various types of display units, including a digital TV or high definition TV (HDTV), a computer system having a video monitor, or other types of display devices.

The subscriber unit 52 also includes a set top box 57 or other logic which is coupled to the television 53. The set top box 57 connects to a cable 58 which couples to the network 40 and hence to media server 50. The set top box logic 57 may be comprised in the television 53 or may comprise an adapter card inserted into a bus of a computer system. The term "set top box" as used herein refers to any type of external logic or device, or any type of logic comprised in a television or other display device, for performing processing functions associated with the display of multimedia content, such as video or audio decompression, executing an interactive application, or displaying the slider bar 54 of the present invention.

As shown, the display screen 59 of the television 53 displays a graphical icon 54 for enabling a user to index into desired positions of a video stream. In the preferred embodiment, the graphical icon 54 is a slider bar 54. The slider bar 54 includes a small knob or cursor 55 which may be moved within the slider bar 54. In the present disclosure, the term "slider bar" includes both the slider bar 54 and the knob 55. The term "slider bar" as used herein is also intended to include other graphical icons for indicating a position in a video stream. As shown, a user, preferably using a remote control 56, operates buttons or dials on the remote control 56 to control movement of the knob 55 within the slider bar 54. The user may manipulate or adjust the knob 55 within the slider bar 54 to effect a "jump" in position within a desired movie or video stream being watched. Thus, if the user has begun watching a movie and desires to "fast forward" or "jump" to the end of the movie, the user simply uses the remote control 56 to move the knob 55 within the slider bar 54 from the left side of the slider bar 54 to the right side of the slider bar 54, i.e., from the beginning of the movie to near the end of the movie.

In response to user manipulation of the knob 55 within slider bar 54, signals are received by the set top box 57. The set top box 57 then preferably calculates information based on the received user input and provides this information back to the respective video server 50 providing the video output stream. As described further below, in response to user manipulation or adjustment of the slider bar 54, the video server 50 provides a video output at the desired position or location in the video stream as indicated by the manipulated slider bar 54.

In the preferred embodiment, the slider bar 54 is displayed by the set top box 57 connected to the television set 53. In the preferred embodiment, the slider bar 54 is only displayed when the user pauses the video stream. When the slider bar 54 is displayed, the set top box 57 updates movement of the knob 55 within slider bar 54 to reflect a current position of the video stream or movie being played on the television 53. Thus when the slider bar 54 is displayed on the screen 58, the knob 55 is displayed at the appropriate location in the slider bar 54 relative to the position of the video stream being displayed. In an alternate embodiment, the slider bar 54 is continuously displayed, and the location of the slider bar knob 55 is updated as the respective video stream is provided to the television 53 through the set top box 57.

In an alternate embodiment of the present invention, the slider bar graphical icon 54 is provided directly by the video server 50 in conjunction with the movie video stream being output. In this embodiment, the video server 50 preferably only displays the slider bar 54 when a pause command is received or other user input is received indicating a desire to use the slider bar 54. The media server 50 displays the knob or cursor 55 of the appropriate location within the slider bar 54 to reflect the current position of the movie being displayed.

Figure 3:
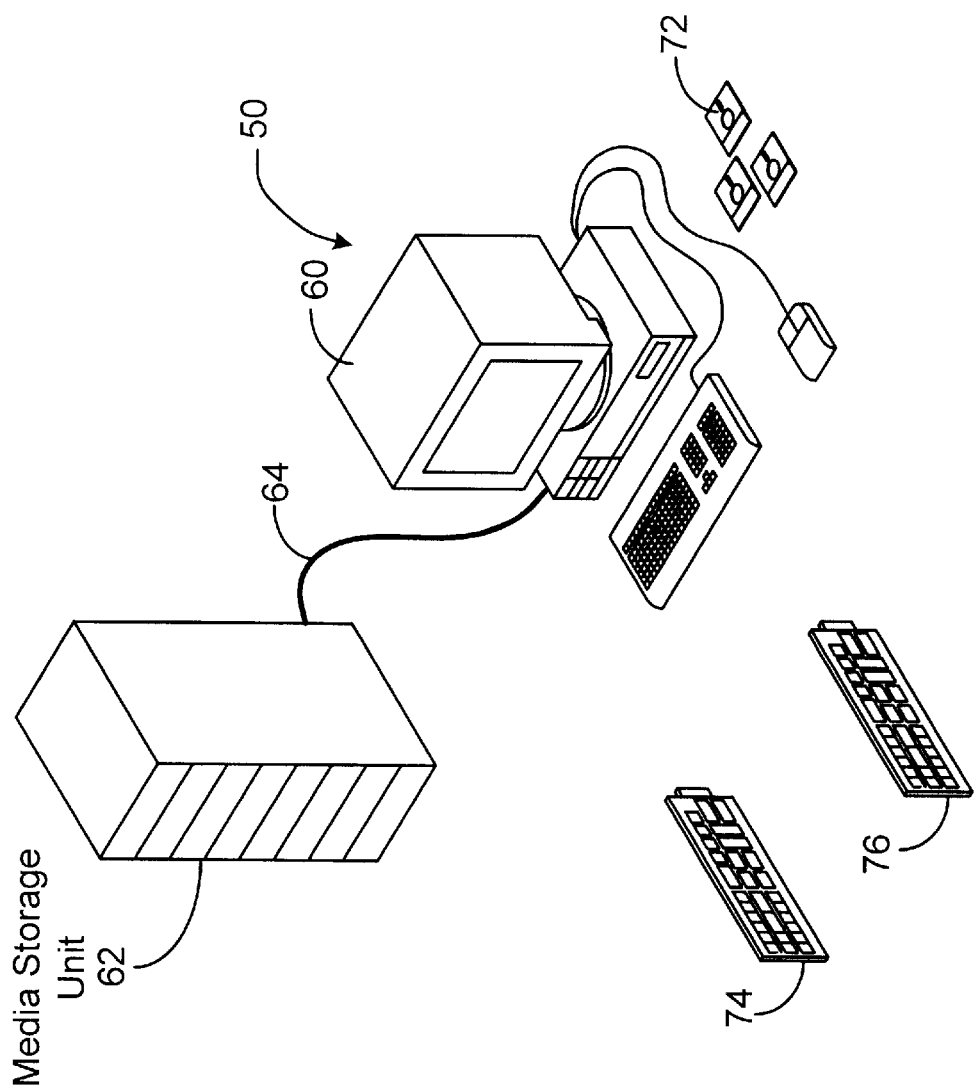
FIG. 3 illustrates the media server of FIG. 1.

FIG. 3—Media Server

Figure 4:
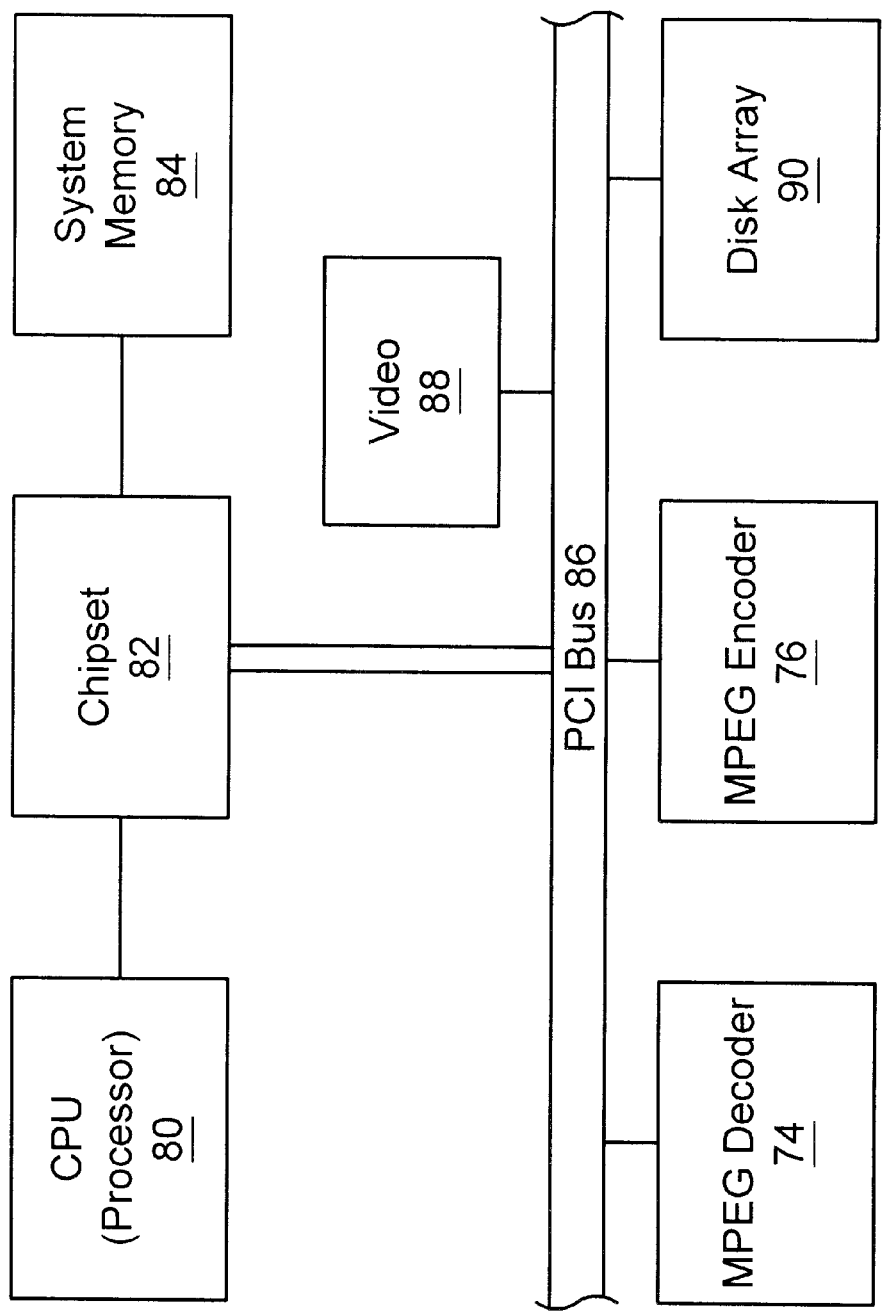
FIG. 4 is a block diagram illustrating the media server computer system of FIG. 3.

Referring now to FIG. 3, in the preferred embodiment the media server or video server 50 comprises a computer system 60. The media server computer system 60 preferably includes various standard components, including one or more processors, one or more buses, a hard drive and memory. FIG. 4 is a block diagram illustrating the components comprised in the media server computer system 60 of FIG. 3. It is noted that FIG. 4 is illustrative only, and other computer architectures may be used, as desired. As shown, the computer system 60 includes at least one processor 80 coupled through chipset logic 82 to a system memory 84. The chipset 82 preferably includes a PCI (Peripheral Component Interconnect) bridge for interfacing to PCI bus 86. The computer system 60 preferably includes a RAID (Redundant Array of Inexpensive Disks) disk array 90 or other storage media for storing the normal play streams and any corresponding trick play streams. The computer system 60 may include either or both of an MPEG decoder 74 and MPEG encoder 76, which are shown connected to PCI bus 86. The computer system 60 may also include video circuitry 88, as shown.

Referring again to FIG. 3, the computer system 60 includes or is coupled to one or more digital storage or media storage devices. For example, in the embodiment of FIG. 2 the computer system 60 couples to a media storage unit 62 through cable 64. The media storage unit 62 may be in addition to, or instead of, a disk storage system in the computer system 60. The media storage unit 62 includes one or more composite RAID drives for storing the normal play streams and any corresponding trick play streams. Alternatively, the media storage unit 62 may instead include one or more CD-ROM drives and/or one or more Digital Video Disk (DVD) storage units, or other types of media, for storing digital video or multimedia content. The computer system 60 may also include one or more internal CD-ROM drives or may couple to one or more separate Digital Video Disk (DVD) storage units. The computer system 60 also may connect to other types of digital or analog storage devices, as desired.

The compressed normal play streams, as well as any associated trick play streams, may be comprised on a storage media in the media server 50, such as a RAID disk array, CD-ROM or Digital Video Disk (DVD). The media server 50 reads the respective normal play or trick play stream from the storage media and provides the data out to the one or more display units or viewers (subscribers) 52. The media server 50 may output the video data using various communication media, such as ATM (Asynchronous Transfer Mode), ISDN (Integrated Services Digital Network), or via satellite. As noted above, the subscriber display units 52 may comprise televisions, computer systems or other systems with a display screen for displaying video content.

As mentioned above, the media server 50 indexes to different locations or positions in a normal play video stream, generally based on user selections. As discussed further below, the media server 50 generates index tables for the various normal plays streams and uses these tables to index to different locations in the various streams. In the preferred embodiment, the index table generation and indexing functions are performed by the media server 50 in software, wherein the software is represented by floppy disks 72. In an alternate embodiment, the computer system 60 includes dedicated hardware which performs one or both of the index table generation and indexing functions. In a third embodiment, a set of related streams, i.e., a normal play stream and associated trick play streams, include indexing information embedded within them to provide for indexing between the streams.

It is noted that the media server 50 may comprise two or more interconnected computers, as desired. It is noted that any of various types of video delivery systems may be used according to the present invention, as desired.

Figure 5:
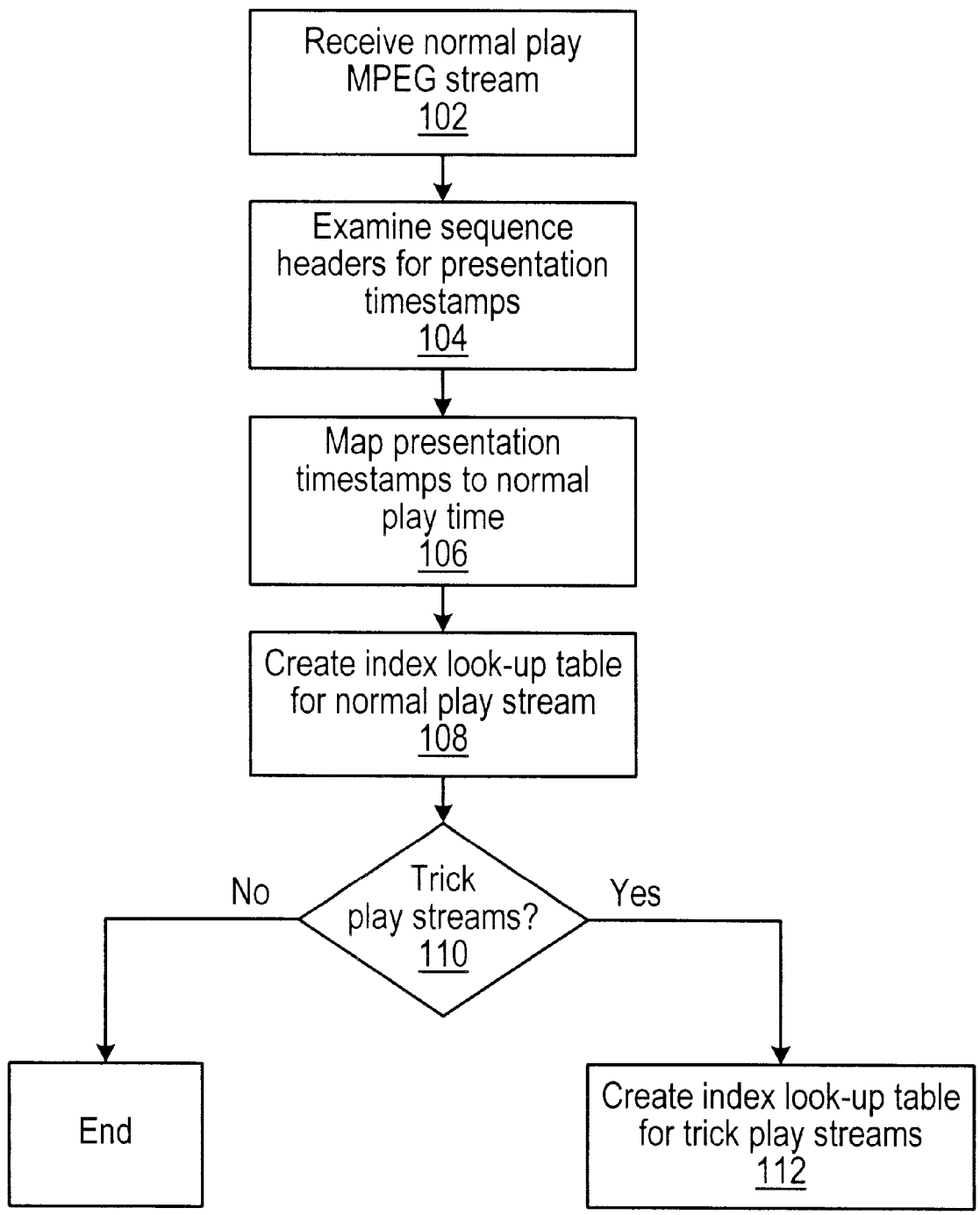
FIG. 5 is a flowchart diagram illustrating generation of index look-up tables for normal play streams and trick play streams according to the present invention.

FIG. 5—Creation of Index Look-up Tables

Referring now to FIG. 5, a diagram illustrating generation of index look-up tables according to the present invention is shown. Here it is presumed that a normal play stream is stored in the system. Where one or more trick play streams are stored in the system, the different streams preferably encode the same content for presentation at different rates. The method of FIG. 5 is used to generate an index table for a normal play stream to enable indexing to different positions in the stream according to the present invention. It is noted that the method of FIG. 5 may also be used to create index tables for indexing between normal play and trick play video streams, as desired.

As shown, in step 102 the system of the present invention receives or examines a normal play video stream or multimedia stream. As discussed above, the normal play stream comprises a stream of video data which is used to present a video sequence, such as a television segment or movie, onto a screen, such as a television or a computer system. In the preferred embodiment, the normal play stream is a compressed stream, preferably an MPEG-2 compressed stream, although other types of compression may be used, as desired.

In step 104 the system of the present invention preferably analyzes timestamps within the stream. In the preferred embodiment where the stream is an MPEG stream, the system analyzes the presentation timestamps from the sequence headers in the stream. As mentioned above, the presentation timestamps are used to provide a time base for the video sequence.

As discussed above, an MPEG encoded stream includes a plurality of I-frames which are intracoded pictures, and a plurality of B and P frames which are interceded frames. The I frames each contain video data for an entire frame of video and are placed periodically in the sequence. The P and B frames include change information relative to prior or subsequent frames. Each picture or frame also includes a picture header which identifies the frame and includes information for that frame. An MPEG encoded stream further includes one or more sequence headers which include certain information regarding the video sequence, including the frame rate and the picture size, among other information. The sequence headers include presentation timestamps which indicate the play time of the video sequence.

In step 106 the system of the present invention preferably maps the presentation timestamps to a "normal play time" standard. Thus the system of the present invention defines a multimedia index based on the concept of "normal play time" that can be associated with a "position" within a multimedia title. The normal play time standard is used for indexing to different positions or locations in the normal play stream according to the present invention. The normal play time standard may also be used for indexing between streams having different presentation rates, i.e., for indexing between normal play and trick play streams. With regard to trick play streams, positions are defined to be equivalent between normal play and/or trick play video streams having different presentation rates when the content present at the respective position is conceptually substantially equivalent, i.e., when the same or substantially the same image in the sequence is being presented, allowing for differences in resolution and other encoding parameters that may be particular to the stream.

In generating the normal play time standard, the system of the present invention examines the presentation timestamps and keeps track of the original or base presentation timestamp at the beginning of the movie. The system then subtracts that base or original presentation timestamp from subsequent timestamps to determine the normal play time values for the normal play stream. In other words, in order to calculate normal play time for a given point in the normal play stream, the system subtracts the base presentation timestamp from a future presentation timestamp at the respective point or location in the normal play stream to determine the normal play time value for that location.

In the preferred embodiment, the normal play time (NPT) for a position in a multimedia stream is the time from the beginning of the title until the respective position when measured by presentation of the normal speed forward or normal play stream. Normal play time corresponds to the speed of the normal play stream and has a one to one correspondence with clock time. Thus, every second the normal play movie ticks forward, normal play time clicks forward one second. In a fast forward file or fast forward trick play stream, if the FF stream is 5× faster, normal play time is 5× faster as the user is watching. In general, any particular scene in the movie is identified by a normal play time. Thus, if a particular scene occurs at X minutes into the movie in normal play time, then this position or scene is referred to as or called X minutes. This particular scene is also located in any of the other trick play streams at X minutes normal play time.

It is noted that other methods may be used to generate index tables for the normal play and trick play streams. In an alternate embodiment, the system of the present invention creates index look-up tables using a list of offsets to each GOP (Group of Pictures). In another embodiment, the system uses the presentation timestamps in the video stream for indexing. Other methods for creating the index tables may be used, as desired. It is also noted that other methods may be used to generate normal play time (NPT) standard index tables for the normal play stream.

In step 108 the system creates an index look-up table for the respective multimedia normal play stream. The index look-up table for the normal play multimedia stream comprises an index or array of two-tuples, wherein each tuple comprises a normal play time value and an offset in the respective stream. If trick play streams exist in the system in step 110, the system optionally creates index look-up tables for the trick play streams in step 112. The index look-up tables for a normal play, fast forward, and fast reverse stream are shown in FIG. 6. As shown, each tuple comprises a normal play time value and a corresponding file offset within the stream. For the normal play stream, the normal play time entries comprise the normal play time values computed in step 106. For trick play streams which have constant bit rate encodings, a scale factor is introduced into the normal play time values of the index look-up tables to compensate for the different presentation rates.

The index look-up tables specify indices or entries each based on a normal play time and a file offset to allow the multimedia server 50 to initiate or stop play at a particular normal play time point in the multimedia stream. The index look-up table for the normal play stream is used according to the present invention to enable the media server 50 to output video data for the normal play video stream at various locations or positions as indicated by user input to the slider bar 54. The index look-up tables for the trick play streams also allow the multimedia server 50 to transfer to and between equivalent positions of streams having different presentation rates, i.e., between normal play and trick play streams.

In one embodiment, the index look-up table only includes tuples representing valid positions for starting, stopping, or transferring between the streams. It is noted that equivalent positions in multimedia streams having different presentation rates will have equal NPT values, although the actual time of presentation from the beginning of the stream to that position will differ for the different streams. It is also noted that equivalent positions in multimedia streams having different presentation rates, although having equal NPT values, will have different byte offsets due to a presumptive difference in length of the streams having different presentation rates.

The creation of the look-up tables is independent of any particular type of video compression or MPEG representation. In the preferred embodiment where MPEG compression is used, the index look-up tables are created by scanning through the MPEG file, noting random access points in the MPEG file, and converting from the presentation timestamp in the MPEG file into the normal play time standard. Conceptually, each index table comprises an array of normal play time vs. scenes, and any particular image or frame in the movie can be identified by the normal play time value. As noted above, an index table is created for the normal play stream as well as any trick play streams, e.g., fast forward and fast reverse streams. Each of the offsets stored in the index table is an index from the normal play time to a byte offset in that MPEG file where the particular scene begins.

Therefore, in the preferred embodiment, the system of the present invention uses a normal play time standard for the index tables. In an alternate embodiment, the system of the present invention creates index look-up tables using a list of offsets to each GOP (Group of Pictures). As noted above, other methods for creating the index tables may be used, as desired.

Figure 7:
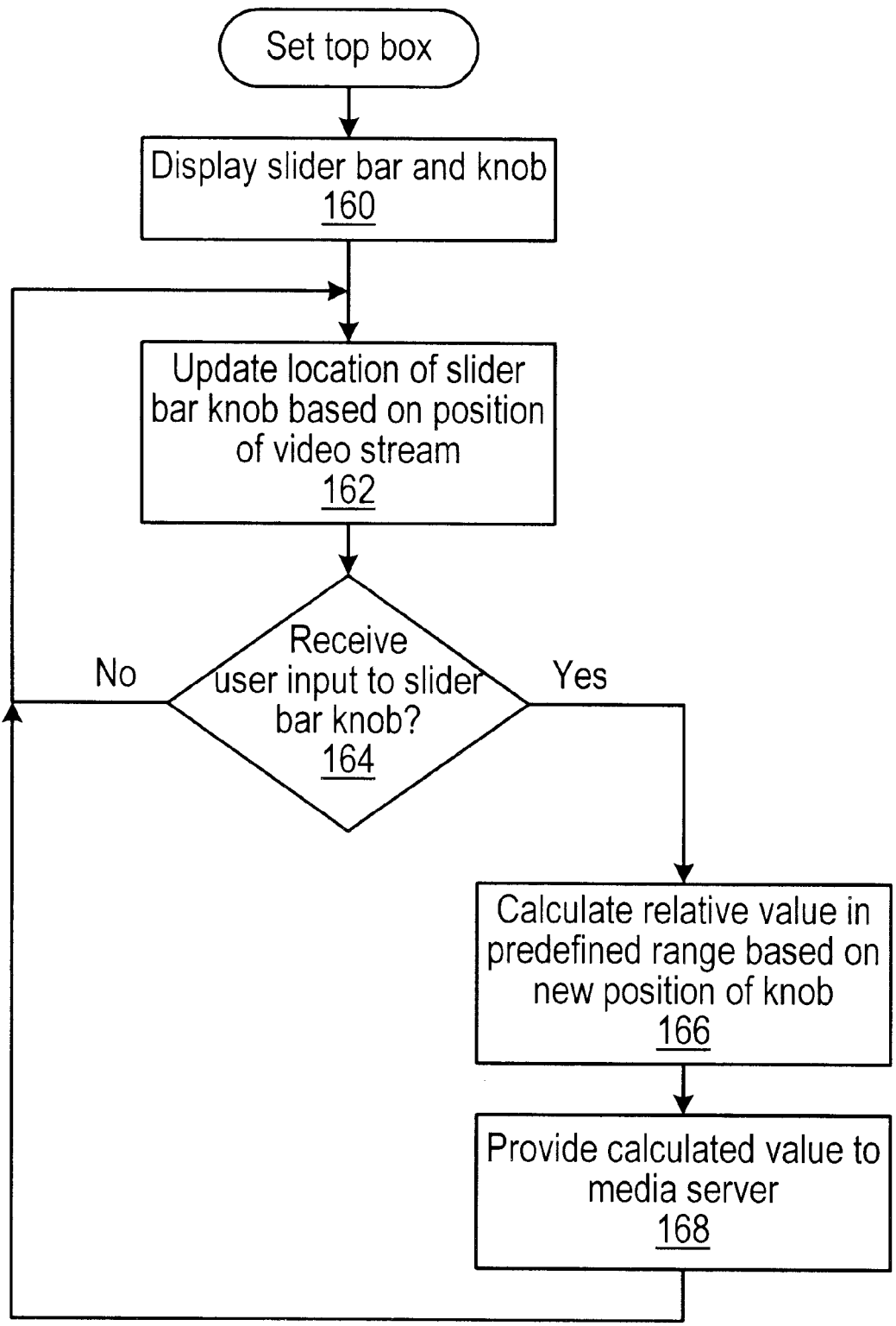
FIG. 7 is a flowchart diagram illustrating operation of the set top box receiving user input regarding user manipulation of the slider bar and providing associated information to the media server.

FIG. 7—Set Top Box Operation

Referring now to FIG. 7, a flowchart diagram illustrating operation of the set top box 57 is shown. FIG. 7 illustrates operation of the set top box 57 with regard to operation of the slider bar 54 and user manipulation of the knob 55 on slider bar 54. As shown, in step 160 the set top box 57 displays the slider bar 54 and knob 55 on the television screen, as shown in FIG. 2. In the preferred embodiment, the user presses a pause button on the remote control 56 to enable display of the slider bar 54. In other words, the slider bar 54 is displayed when the user presses the pause button. In another embodiment, the user's remote control 56 includes a dedicated button or menu selection which enables or disables display of the slider bar 54. Thus, it is presumed in the flowchart of FIG. 7 that the set top box 57 displays the slider bar 54 in response to user input from the remote control 56.

In step 162 the set top box 57 updates the location of the slider bar knob 55 within the slider bar 54 based on the position of the video stream received from the media server 50. Thus, when the slider bar 54 is displayed, the set top box 57 updates the location of the slider bar knob 55 to the position where the video stream or movie is being played. Thus the slider bar knob 55 provides an indication of the relative portion of the movie which has been displayed. It is noted that step 162 is an optional step which may be omitted, i.e., the slider bar knob 55 may only be updated based upon user manipulation of the slider bar 54 and not on normal play of the movie or video stream.

When the user provides input to the slider bar knob 55 as determined in step 164, then in step 166 the set top box 57 calculates a relative value in a predefined range based on the new position of the knob 55. Thus, here it is assumed that the user using the remote control 56 or other device has manipulated the slider bar knob 55 on the slider bar 54 to jump or index to a different place in the video stream or movie. When user input is determined to be received in step 164, the set top box 57 calculates a value in a predefined range. In the preferred embodiment, the predefined range is a value between 0 and 100, where 0 is the absolute beginning of the movie or stream and 100 is the absolute end of the movie or stream, and the values in between indicate relative positions within the stream. Thus, after the user has manipulated the slider bar knob 55, the set top box 57 examines the new position of the knob 55, i.e., analyzes the received user input, and calculates a relative value between 0 and 100 based on the new position of the knob 55 in step 166. After calculating this new relative value in step 166, in step 168 the set top box 57 provides the calculated value to the media server 50. As discussed further below, this calculated value is received by the media server 50 and used to output the video stream at a new position based on the user manipulation of the slider bar knob 55.

Figure 8:
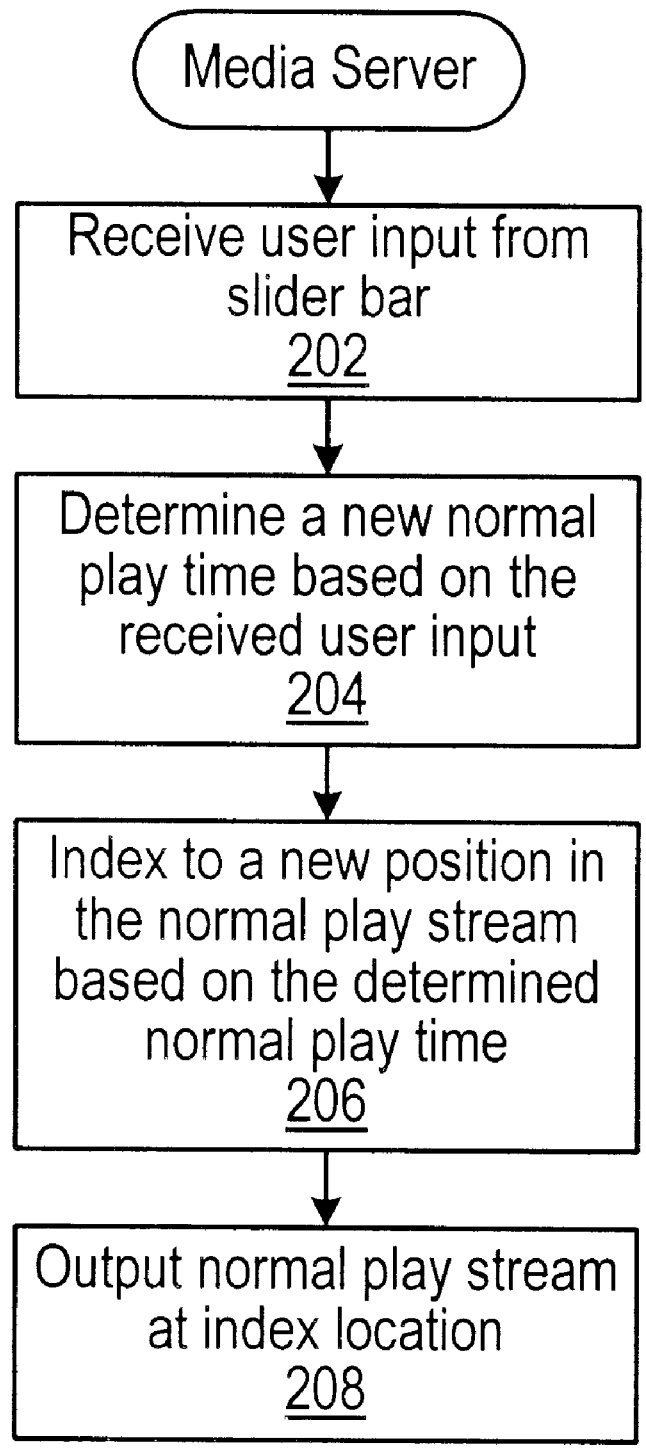
FIG. 8 is a flowchart diagram illustrating operation of the media server indexing to a new position in the normal play stream based on received user input from the set top box according to the present invention.

FIG. 8—Media Server Operation

Referring now to FIG. 8, a flowchart diagram illustrating operation of the media server 50 transferring the normal play video stream in response to user manipulation of the slider bar 54 is shown. Here it is assumed that a video stream or multimedia stream is being output from the media server 50 to a subscriber unit 52, and the user has adjusted the knob 55 on the slider bar 54 to index or "jump" to a different part or place in the stream or movie.

In step 202 the media server 50 receives information from the set top box 57, where this information was generated in response to user input from the slider bar 54. The user input is provided initially by the user to the television and/or set top box 57, and this user input is provided from the set top box 57 to the media server in step 202. In the preferred embodiment, the user input received in step 202, which is provided by the subscriber device or set top box 57, comprises a value from a predetermined range, preferably 0–100, indicating a relative position in the movie based on user manipulation of the slider bar 54.

In step 204 the media server 50 determines a new normal play time value based on the received user input. In step 204 the media server 50 uses the value from the predetermined range, i.e., the value from 0–100, and also uses the movie time length stored in the memory of the media server 50, to calculate a normal play time value. For example, if the user adjusts the knob on the slider bar to place the knob in the exact middle of the slider bar 54, the set top box 57 provides an output of 50 to the media server 50. If the movie length is exactly two hours, the media server 50 outputs a normal play time value of one hour. The normal play time value is computed as 0.5×2 hours=1 hour. As another example, if the user adjusts the knob 55 on the slider bar 54 to place the knob 55 at exactly the one-third position in the slider bar 54, i.e., one-third from the left, the subscriber device provides an output of 33 to the media server 50. Assuming again that the movie length is exactly two hours, the media server 50 outputs a normal play time value of 40 minutes, which is one-third the length of the movie.

In the preferred embodiment, a program executing on the media server scales the movie duration by the 0–100 factor received from the set top box, and then requests the media server to position the movie or video sequence to the resulting normal play time (NPT) value. It is noted that other methods may be used to determine a correct normal play time based on the received user input in step 204. For example, in one embodiment the set top box 57 performs step 204. In this embodiment, the set top box 57 receives or caches a movie length value at the beginning of the movie or video stream and stores this movie length value in memory. Thus, when the set top box 57 receives the user input of the knob placement within the slider bar 54, the set top box 57 uses the movie length to calculate a normal play time which is then provided to the media server in step 202. In this embodiment, the set top box 57 is required to access the index tables, which are stored either in the media server 50 or in the set top box 57.

After a new normal play time is determined based on the received user input in step 204, in step 206 the media server 50 indexes to a new position in the normal play stream based on the normal play time determined in step 204. Thus in step 206 the media server uses the normal play time calculated in step 204 to retrieve an offset from the normal play stream index table. In step 208 the media server 50 outputs the normal play stream at the indexed location or offset position determined in step 206.

Therefore, in response to the user manipulating the knob 55 on the slider bar 54, the media server 50 outputs the respective video stream at a new position or location within the stream based on the user's manipulation of the knob 55 and the slider bar 54. This provides a very intuitive way for the user to fast forward and/or fast reverse within the video stream. In other words, this provides a simple and intuitive mechanism for the user to jump to any desired place in the video stream.

Thus, a change in position or location of the output of a respective stream being output at a given normal play time is accomplished by finding the tuple in the respective index table for the nearest normal play time and utilizing the associated file offset as the point to initiate play of the stream.

In one embodiment of the present invention, set top box 57 includes a cache memory which stores the position of the slider bar knob 55 prior to the user's first manipulation of the slider bar knob 55. Thus, if the user has watched 20 minutes of a movie and desires to advance or reverse to various different parts of the movie, and then desires to return to his original place within the movie to resume viewing, the user may select a button on the remote control 56 which places the slider bar knob 55 in the position the knob was in prior to any user manipulations of the slider bar. This provides a more convenient mechanism for returning to a place in the movie or video stream prior to slider bar manipulations.

Therefore, the present invention comprises a system and method which provides a graphical icon or slider bar for indexing to different positions or locations in a normal play video stream. The present invention examines the presentation timestamps in the sequence headers of the normal play stream and creates a normal play time standard. The system then creates an index table or look-up table for the stream. The index table for the stream comprises normal play time values and corresponding offsets into the respective stream. During play, when the user manipulates or adjusts the slider bar knob, the subscriber device or set top box calculates a corresponding value and provides this value to the media server 50. The media server 50 uses the respective index table to intelligently jump or index to the appropriate position in the normal play stream and begin outputting the stream at this new position.

Although the system and method of the present invention has been described in connection with the described embodiments, it is not intended to be limited to the specific form set forth herein, but on the contrary, it is intended to cover such alternatives, modifications, and equivalents, as can be reasonably included within the spirit and scope of the invention as defined by the appended claims.

We claim:

1. A computer implemented method for selecting output positions in a video stream in a video delivery system, wherein the video delivery system includes a video server and a subscriber device coupled to the video server, wherein the subscriber device includes a display, the method comprising:

displaying on the display of the subscriber device a video stream received from the video server;

displaying on the display of the subscriber device a graphical icon for selecting output positions within the video stream, wherein the graphical icon is adjustable to effect changes in position of the received video stream;

receiving first user input indicating a new output position of the video stream;

the subscriber device providing information to the video server in response to said receiving first user input;

the video server determining the new output position for the video stream in response to receiving said information from the subscriber device;

the video server outputting the video stream at the new position in response to said determining the new output position; and displaying on the display of the subscriber device the video stream at the new position in response to said outputting.

2. The method of claim 1, wherein said receiving first user input comprises receiving an adjustment to said graphical icon.

3. The method of claim 2, wherein said graphical icon includes an adjustable knob which is adjustable to effect changes in position of the received video stream, wherein said receiving first user input comprises moving the knob in the graphical icon to a new position in the graphical icon.

4. The method of claim 1, wherein the video server stores an index table corresponding to the video stream, wherein the index table comprising a plurality of tuples, wherein each of said tuples comprises a first value and a second offset value which is an offset into a position of the video stream, wherein said video server determining the new position of the video stream in response to said received information comprises the video server indexing into the index look-up table to obtain an offset into the video stream.

5. The method of claim 4, wherein each of said plurality of tuples comprises a normal play time value and an offset into the video stream;

wherein said subscriber device providing information comprises the subscriber device providing a value within a predetermined range indicating a relative position within the video stream based on said received first user input; and wherein said video server determining the new output position for the video stream comprises the video server determining a normal play time value based on said value in said predetermined range provided by said subscriber device.

6. The method of claim 5, wherein said predetermined range comprises a range from 0 to 100.

7. The method of claim 1, wherein said graphical icon comprises a slider bar including a knob, wherein the knob is located at a position in the slider bar to indicate the position of the output video stream received by the subscriber device.

8. The method of claim 1, further comprising:

receiving second user input to pause the video stream;

wherein said displaying on the display of the subscriber device said graphical icon is performed in response to said receiving the second user input to pause the video stream.

9. The method of claim 8, wherein said graphical icon includes an adjustable knob which is adjustable to effect changes in position of the received video stream, the method further comprising:

updating the location of the knob on the graphical icon in response to said displaying on the display of the subscriber device said graphical icon, wherein said updating updates the location of the knob on the graphical icon according to a current location of the output stream.

10. The method of claim 1, wherein said subscriber device includes a television set.

11. The method of claim 1, wherein said subscriber device comprises a television set and a set top box coupled to the television set.

12. An interactive video delivery system which enables a user to select output positions in a video stream, comprising:

a video server which outputs a video stream, wherein the video server is capable of selectively outputting said video stream at different positions of said video stream; and a subscriber device coupled to the video server which receives the video stream output from the video server, wherein the subscriber device includes:

a display which displays the video stream received from the video server, wherein the display also displays a graphical icon for selecting output positions within the video stream, wherein the graphical icon is adjustable to effect changes in position of the received video stream;

an input for receiving first user input indicating a new output position of the video stream; and means for providing information to the video server in response to receiving said first user input; and wherein the video server includes an input for receiving said information; wherein said video server outputs the video stream at the new position in response to receiving said information from the subscriber device;

wherein the subscriber device displays the video stream at the new position on the display in response to receiving the video stream at the new position from the video server.

13. The interactive video delivery system of claim 12, wherein the subscriber device input comprises an input for receiving an adjustment to said graphical icon.

14. The interactive video delivery system of claim 13, wherein said graphical icon includes an adjustable knob which is adjustable to effect changes in position of the received video stream, wherein the knob in the graphical icon is movable to a new position in the graphical icon;

wherein the subscriber device input comprises an input for receiving an adjustment to the knob in said graphical icon.

15. The interactive video delivery system of claim 12, wherein the video server includes means for determining the new output position for the video stream in response to receiving said information from the subscriber device.

16. The interactive video delivery system of claim 15, wherein the video server further comprises:

a memory which stores an index table corresponding to the video stream, wherein the index table comprising a plurality of tuples, wherein each of said tuples comprises a first value and a second offset value which is an offset into a position of the video stream;

wherein said means for determining the new output position for the video stream indexes into the index look-up table stored in said memory to obtain an offset into the video stream.

17. The interactive video delivery system of claim 16, wherein each of said plurality of tuples comprises a normal play time value and an offset into the video stream;

wherein said means for providing information provides a value within a predetermined range indicating a relative position within the video stream based on said received first user input; and wherein said means for determining the new output position for the video stream determines a normal play time value based on said received value in said predetermined range.

18. The interactive video delivery system of claim 17, wherein said predetermined range comprises a range from 0 to 100.

19. The interactive video delivery system of claim 12, wherein said graphical icon comprises a slider bar including a knob, wherein the knob is located at a position in the slider bar to indicate the position of the output video stream received by the subscriber device.

20. The interactive video delivery system of claim 12, wherein said input for receiving said first user input indicating a new output position of the video stream operates in response to receiving second user input to pause the video stream;

wherein said subscriber device displays said graphical icon on the display in response to said receiving second user input to pause the video stream.

21. The interactive video delivery system of claim 20, wherein said graphical icon includes an adjustable knob which is adjustable to effect changes in position of the received video stream;

wherein the subscriber device further comprises:

means for updating the location of the knob on the graphical icon in response to said subscriber device displaying on the display of the subscriber device said graphical icon, wherein said means for updating updates the location of the knob on the graphical icon according to a current location of the output stream.

22. The interactive video delivery system of claim 12, wherein said subscriber device includes a television set.

23. The interactive video delivery system of claim 12, wherein said subscriber device comprises a television set and a set top box coupled to the television set.

24. A computer implemented method for selecting output positions in a video stream in a video delivery system, wherein the video delivery system includes a video server for providing a video stream, the method comprising:

the video server providing a video stream to a subscriber device;

the video server receiving user input from the subscriber device indicating a new output position of the video stream, where the user input comprises information regarding a change in position of a slider bar displayed on the subscriber device;

the video server determining the new output position for the video stream in response to receiving said information from the subscriber device;

the video server outputting the video stream at the new position in response to said determining the new output position; and the subscriber device displaying the video stream at the new position in response to receiving the video stream at the new position from the video server.

25. The method of claim 24, wherein the video server stores an index table corresponding to the video stream, wherein the index table comprising a plurality of tuples, wherein each of said tuples comprises a first value and a second offset value which is an offset into a position of the video stream, wherein said video server determining the new output position of the video stream in response to said received user input comprises the video server indexing into the index look-up table to obtain an offset into the video stream.

26. An interactive video delivery system which enables a user to select output positions in a video stream, comprising:

a video server which outputs a video stream, wherein the video server is capable of selectively outputting said video stream at different positions of said video stream, wherein the video server includes an input for receiving information from a subscriber device regarding a user-selected position of a slider bar displayed on the subscriber device, wherein said video server outputs the video stream at a new position in response to receiving said information from the subscriber device, wherein the subscriber device receives and displays the video stream at the new position in response to said video stream outputting the video stream at the new position.

27. The interactive video delivery system of claim 26, wherein the video server further comprises:

a memory which stores an index table corresponding to the video stream, wherein the index table comprising a plurality of tuples, wherein each of said tuples comprises a first value and a second offset value which is an offset into a position of the video stream;

wherein said means for determining a new output position for the video stream indexes into the index look-up table stored in said memory to obtain an offset into the video stream.

* * * * *